US012113317B2

(12) United States Patent
Van Swearingen et al.

(10) Patent No.: US 12,113,317 B2
(45) **Date of Patent: *Oct. 8, 2024**

(54) CONNECTOR AND COAXIAL CABLE WITH MOLECULAR BOND INTERCONNECTION

(71) Applicant: Outdoor Wireless Networks LLC, Claremont, NC (US)

(72) Inventors: Kendrick Van Swearingen, Woodridge, IL (US); James P. Fleming, Orland Park, IL (US)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,665

(22) Filed: Aug. 21, 2023

(65) Prior Publication Data

US 2024/0154372 A1 May 9, 2024

Related U.S. Application Data

(60) Continuation of application No. 17/823,202, filed on Aug. 30, 2022, now Pat. No. 11,735,874, which is a (Continued)

(51) Int. Cl.
*H01R 24/38* (2011.01)
*H01R 4/02* (2006.01)

(Continued)

(52) U.S. Cl.
CPC ............ *H01R 24/38* (2013.01); *H01R 4/029* (2013.01); *H01R 9/05* (2013.01); *H01R 13/5205* (2013.01);

(Continued)

(58) Field of Classification Search
CPC ........ H01R 24/38; H01R 24/40; H01R 4/029; H01R 9/05; H01R 13/5205;

(Continued)

(56) References Cited

U.S. PATENT DOCUMENTS 3,089,105 A 5/1963 Alford
3,142,716 A 7/1964 Gardener (Continued)

FOREIGN PATENT DOCUMENTS

CN 1606200 A 4/2005
CN 1623254 A 6/2005

(Continued)

OTHER PUBLICATIONS

"Chinese Office Action and Search Report Corresponding to Chinese Application No. 201380057933.8; Date of Issuance: Jun. 30, 2016; Foreign Text 8 Pages, English Translation Thereof, 9 Pages".

(Continued)

*Primary Examiner* — Harshad C Patel
(74) *Attorney, Agent, or Firm* — Myers Bigel, P.A.

(57) ABSTRACT

A coaxial connector in combination with a coaxial cable is provided with an inner conductor supported coaxial within an outer conductor, a polymer jacket surrounding the outer conductor. A unitary connector body with a bore is provided with an overbody surrounding an outer diameter of the connector body. The outer conductor is inserted within the bore. A molecular bond is formed between the outer conductor and the connector body and between the jacket and the overbody. An inner conductor end cap may also be provided coupled to the end of the inner conductor via a molecular bond.

17 Claims, 10 Drawing Sheets

Related U.S. Application Data continuation of application No. 17/158,286, filed on Jan. 26, 2021, now Pat. No. 11,437,766, which is a continuation of application No. 15/443,690, filed on Feb. 27, 2017, now abandoned, which is a continuation of application No. 14/520,749, filed on Oct. 22, 2014, now Pat. No. 9,583,847, which is a division of application No. 13/240,344, filed on Sep. 22, 2011, now Pat. No. 8,887,388, which is a continuation-in-part of application No. 13/170,958, filed on Jun. 28, 2011, now Pat. No. 9,728,926, and a continuation-in-part of application No. 13/161,326, filed on Jun. 15, 2011, now Pat. No. 8,365,404, and a continuation-in-part of application No. 13/070,934, filed on Mar. 24, 2011, now Pat. No. 9,768,574, and a continuation-in-part of application No. 12/980,013, filed on Dec. 28, 2010, now Pat. No. 8,453,320, and a continuation-in-part of application No. 12/974,765, filed on Dec. 21, 2010, now Pat. No. 8,563,861, and a continuation-in-part of application No. 12/962,943, filed on Dec. 8, 2010, now Pat. No. 8,302,296, and a continuation-in-part of application No. 12/951,558, filed on Nov. 22, 2010, now Pat. No. 8,826,525.

(51) Int. Cl.

*H01R 9/05* (2006.01)
*H01R 13/52* (2006.01)
*H01R 13/58* (2006.01)
*H01R 24/40* (2011.01)
*H01R 43/02* (2006.01)
*H01R 43/20* (2006.01)
*H01R 103/00* (2006.01)

(52) U.S. Cl.

CPC ......... *H01R 13/5845* (2013.01); *H01R 24/40* (2013.01); *H01R 43/0207* (2013.01); *H01R 43/20* (2013.01); *H01R 2103/00* (2013.01); *Y10T 29/49002* (2015.01); *Y10T 29/49123* (2015.01); *Y10T 29/49174* (2015.01); *Y10T 29/49179* (2015.01)

(58) Field of Classification Search

CPC ........................... H01R 13/5845; H01R 43/20; H01R 43/0207; H01R 2103/00
See application file for complete search history.

(56) References Cited

U.S. PATENT DOCUMENTS 3,219,557 A 11/1965 Quintana
3,245,027 A 4/1966 Ziegler, Jr.
3,264,602 A 8/1966 Oscar
3,281,756 A 10/1966 Francis et al.
3,295,095 A 12/1966 Karl
3,384,703 A 5/1968 Forney, Jr. et al.
3,453,376 A 7/1969 Ziegler, Jr. et al.
3,497,866 A * 2/1970 Patton, Jr. ............. H01R 24/38 439/668
3,601,776 A 8/1971 Curl
3,644,878 A 2/1972 Toedtman
3,656,092 A 4/1972 Swengel, Sr. et al.
3,665,367 A 5/1972 Keller et al.
3,690,088 A 9/1972 Anderson et al.
3,693,238 A 9/1972 Hoch et al.
3,720,805 A 3/1973 Fitzgerald
3,728,781 A 4/1973 Curtis et al.
3,897,896 A 8/1975 Louw et al.
3,897,897 A 8/1975 Satzler et al.
3,917,497 A 11/1975 Stickler
3,949,466 A 4/1976 O'brien et al.
3,980,976 A 9/1976 Tadama et al.
4,039,244 A 8/1977 Leachy
4,046,451 A 9/1977 Juds et al.
4,090,898 A 5/1978 Tuskos
4,176,909 A 12/1979 Prunier
4,226,652 A 10/1980 Berg
4,235,498 A 11/1980 Snyder
4,241,973 A 12/1980 Mayer et al.
4,353,761 A 10/1982 Woerz et al.
4,397,515 A 8/1983 Russell
4,457,795 A 7/1984 Mason et al.
4,521,642 A 6/1985 Vives
4,534,751 A 8/1985 Fortuna et al.
4,584,037 A 4/1986 Fortuna et al.
4,715,821 A 12/1987 Axell
4,741,788 A 5/1988 Clark et al.
4,743,331 A 5/1988 Nuttall et al.
4,746,305 A 5/1988 Nomura
4,790,375 A 12/1988 Bridges et al.
4,790,775 A 12/1988 David
4,824,400 A 4/1989 Spinner
4,846,714 A 7/1989 Welsby et al.
4,867,370 A 9/1989 Welter et al.
4,891,015 A 1/1990 Oldfield
4,943,245 A 7/1990 Lincoln
5,046,952 A 9/1991 Cohen et al.
5,064,485 A 11/1991 Smith et al.
5,074,809 A 12/1991 Rousseau
5,076,657 A 12/1991 Toya et al.
5,120,237 A 6/1992 Fussell
5,120,268 A 6/1992 Gerrans
5,137,470 A 8/1992 Doles
5,137,478 A 8/1992 Graf et al.
5,142,763 A 9/1992 Toya et al.
5,154,636 A 10/1992 Vaccaro et al.
5,167,533 A 12/1992 Rauwolf
5,186,644 A 2/1993 Pawlicki et al.
5,203,079 A 4/1993 Brinkman et al.
5,284,449 A 2/1994 Vaccaro
5,299,939 A 4/1994 Walker et al.
5,354,217 A 10/1994 Gabel et al.
5,385,490 A 1/1995 Demeter et al.
5,435,745 A 7/1995 Booth
5,464,963 A 11/1995 Hostler et al.
5,474,470 A 12/1995 Hammond, Jr.
5,486,123 A 1/1996 Miyazaki
5,542,861 A 8/1996 Anhalt et al.
5,545,059 A 8/1996 Nelson
5,561,900 A 10/1996 Hosler, Sr.
5,595,499 A 1/1997 Zander et al.
5,700,989 A 12/1997 Dykhno et al.
5,711,686 A 1/1998 Osullivan et al.
5,722,856 A 3/1998 Fuchs et al.
5,733,145 A 3/1998 Wood
5,789,725 A 8/1998 Mcintire et al.
5,791,919 A 8/1998 Brisson et al.
5,796,315 A 8/1998 Gordon et al.
5,802,710 A 9/1998 Bufanda et al.
5,802,711 A 9/1998 Card et al.
5,823,824 A 10/1998 Mitamura et al.
5,830,009 A 11/1998 Tettinger
5,929,728 A 7/1999 Barnett et al.
5,938,474 A 8/1999 Nelson
5,994,646 A 11/1999 Broeksteeg et al.
6,007,378 A 12/1999 Oeth
6,024,609 A 2/2000 Kooiman et al.
6,032,835 A 3/2000 Burt
6,036,237 A 3/2000 Sweeney
6,056,577 A 5/2000 Blanchet
6,093,043 A 7/2000 Gray et al.
6,105,849 A 8/2000 Mochizuki et al.
6,126,487 A 10/2000 Rosenberger
6,133,532 A 10/2000 Lundbaeck et al.
6,139,354 A 10/2000 Broussard
6,148,237 A 11/2000 Das
6,155,212 A 12/2000 Mcalister
6,173,097 B1 1/2001 Throckmorton et al.
6,174,200 B1 1/2001 Bigotto et al.
6,176,716 B1 1/2001 Mercurio et al.

(56) References Cited

U.S. PATENT DOCUMENTS 6,210,222 B1 4/2001 Langham et al.
6,267,621 B1 7/2001 Pitschi et al.
6,287,301 B1 9/2001 Thompson et al.
6,332,808 B1 12/2001 Kanda et al.
6,361,364 B1 3/2002 Holland et al.
6,362,428 B1 3/2002 Pennington
6,394,187 B1 5/2002 Dickson et al.
6,407,722 B1 6/2002 Bogner et al.
6,439,924 B1 8/2002 Kooiman
6,471,545 B1 10/2002 Hosler, Sr.
6,482,036 B1 11/2002 Broussard
6,538,203 B1 3/2003 Noelle et al.
6,588,646 B2 7/2003 Loprire
6,607,398 B2 8/2003 Henningsen
6,607,399 B2 8/2003 Endo et al.
6,632,118 B2 10/2003 Jacob
6,752,668 B2 6/2004 Koch, Jr.
6,776,620 B2 8/2004 Noda
6,786,767 B1 9/2004 Fuks et al.
6,790,080 B2 9/2004 Cannon
6,793,095 B1 9/2004 Dulisse et al.
6,814,625 B2 11/2004 Richmond et al.
6,824,415 B2 11/2004 Wlos
6,827,608 B2 12/2004 Hall et al.
6,832,785 B1 12/2004 Zitkovic, Jr.
6,837,751 B2 1/2005 Vanden Wymelenberg et al.
6,908,114 B2 6/2005 Moner
6,932,644 B1 8/2005 Taylor
6,955,562 B1 10/2005 Henningsen
6,974,615 B2 12/2005 Hosaka et al.
7,044,785 B2 5/2006 Harwath et al.
7,061,829 B2 6/2006 Scott
7,077,700 B2 7/2006 Henningsen
7,114,990 B2 10/2006 Bence et al.
7,134,190 B2 11/2006 Bungo et al.
7,144,274 B2 12/2006 Taylor
7,198,208 B2 4/2007 Dye et al.
7,217,154 B2 5/2007 Harwath
7,275,957 B1 10/2007 Wlos et al.
7,294,023 B2 11/2007 Schneider
7,309,247 B1 12/2007 Keating
7,335,059 B2 2/2008 Vaccaro
7,347,727 B2 3/2008 Wlos et al.
7,347,738 B2 3/2008 Hsieh et al.
7,351,101 B1 4/2008 Montena
7,374,466 B2 5/2008 Onuma et al.
7,399,069 B2 7/2008 Therien
7,435,135 B2 10/2008 Wlos
7,448,906 B1 11/2008 Islam
7,476,114 B1 1/2009 Contreras
7,500,873 B1 3/2009 Hart
7,520,779 B2 4/2009 Arnaud et al.
7,588,460 B2 9/2009 Malloy et al.
7,607,942 B1 10/2009 Van Swearingen
7,632,143 B1 12/2009 Islam
7,677,812 B2 3/2010 Castagna et al.
7,705,238 B2 4/2010 Van Swearingen
7,731,529 B1 6/2010 Islam
7,753,727 B1 7/2010 Islam et al.
7,754,038 B2 7/2010 Ripplinger et al.
7,798,847 B2 9/2010 Islam
7,798,848 B2 * 9/2010 Islam .................. H01R 9/0521 439/585
7,803,018 B1 9/2010 Islam
7,806,444 B2 10/2010 Blivet et al.
7,819,302 B2 10/2010 Bolser et al.
7,819,698 B2 10/2010 Islam
7,823,763 B2 11/2010 Sachdev et al.
8,113,879 B1 2/2012 Zraik
8,174,132 B2 5/2012 Van Swearingen
8,302,296 B2 11/2012 Van Swearingen
8,317,539 B2 11/2012 Stein
8,388,377 B2 3/2013 Zraik
8,453,320 B2 6/2013 Van Swearingen et al.
8,469,739 B2 6/2013 Rodrigues et al.
8,479,383 B2 7/2013 Van Swearingen et al.
8,545,263 B2 10/2013 Islam
8,597,050 B2 12/2013 Flaherty et al.
8,622,762 B2 1/2014 Van Swearingen et al.
8,690,602 B2 4/2014 Flaherty, IV
8,801,460 B2 8/2014 Van Swearingen et al.
8,826,525 B2 9/2014 Vaccaro et al.
8,887,379 B2 11/2014 Van Swearingen et al.
8,887,388 B2 11/2014 Van Swearingen et al.
9,889,586 B2 2/2018 Van Swearingen et al.
11,437,766 B2 * 9/2022 Van Swearingen .... H01R 4/029
11,437,767 B2 * 9/2022 Van Swearingen .......................... H01R 13/5205
11,462,843 B2 10/2022 Van Swearingen
11,735,874 B2 * 8/2023 Van Swearingen .......................... H01R 43/0207 439/578
11,757,212 B2 9/2023 Van Swearingen
2003/0137372 A1 7/2003 Fehrenbach et al.
2004/0082212 A1 4/2004 Cannon
2004/0118590 A1 6/2004 Head
2004/0196115 A1 10/2004 Fallon et al.
2005/0118590 A1 6/2005 Piel
2005/0181652 A1 8/2005 Montena et al.
2005/0250371 A1 11/2005 Koga
2005/0285702 A1 12/2005 Graczyk et al.
2006/0137893 A1 6/2006 Sumi et al.
2006/0199432 A1 9/2006 Taylor
2007/0042642 A1 2/2007 Montena et al.
2007/0141911 A1 6/2007 Yoshikawa et al.
2007/0190868 A1 8/2007 De Cloet et al.
2007/0224880 A1 9/2007 Wlos et al.
2007/0259565 A1 11/2007 Holland
2007/0272724 A1 11/2007 Christopherson
2009/0151975 A1 6/2009 Moe et al.
2009/0218027 A1 9/2009 Moe
2009/0232594 A1 9/2009 Ng et al.
2010/0041271 A1 2/2010 Van Swearingen et al.
2010/0124839 A1 5/2010 Montena
2010/0130060 A1 5/2010 Islam
2010/0190377 A1 7/2010 Islam
2010/0190378 A1 7/2010 Islam
2010/0233903 A1 9/2010 Islam
2010/0254663 A1 * 10/2010 Hopkins ............ G02B 6/38875 385/78
2010/0288819 A1 11/2010 Huenig et al.
2011/0028023 A1 2/2011 Mahoney
2011/0201232 A1 8/2011 Islam
2011/0239451 A1 10/2011 Montena et al.
2012/0124827 A1 5/2012 Baldauf
2012/0129375 A1 5/2012 Van Swearingen
2012/0129383 A1 5/2012 Van Swearingen
2012/0129384 A1 5/2012 Van Swearingen
2012/0129388 A1 5/2012 Vaccaro et al.
2012/0129389 A1 5/2012 Van Swearingen
2012/0129390 A1 5/2012 Van Swearingen et al.
2012/0129391 A1 5/2012 Van Swearingen et al.
2013/0023973 A1 1/2013 Richard et al.
2013/0025121 A1 1/2013 Van Swearingen et al.
2013/0084738 A1 4/2013 Van Swearingen et al.
2013/0084740 A1 4/2013 Paynter et al.
2013/0095695 A1 4/2013 Van Swearingen
2013/0244487 A1 9/2013 Van Swearingen et al.
2014/0154921 A1 6/2014 Qi et al.
2015/0229070 A1 8/2015 Van Swearingen
2015/0340804 A1 11/2015 Van Swearingen et al.
2017/0133769 A1 5/2017 Harwath et al.
2017/0170612 A1 6/2017 Van Swearingen et al.
2017/0338613 A1 11/2017 Van Swearingen

FOREIGN PATENT DOCUMENTS

CN 101055948 A 10/2007
CN 201084845 Y 7/2008
CN 101494326 A 7/2009
CN 102610973 A 7/2012
DE 4210547.1 C1 6/1993
EP 0555933 A1 8/1993

(56) References Cited

FOREIGN PATENT DOCUMENTS

| | | | |
|---|---|---|---|
| EP | 0779676 | A1 | 6/1997 |
| EP | 1001496 | A2 | 5/2000 |
| EP | 1947661 | A1 | 7/2008 |
| EP | 1956687 | A2 | 8/2008 |
| EP | 2144338 | A1 | 1/2010 |
| EP | 2214265 | A1 | 8/2010 |
| EP | 2219267 | A1 | 8/2010 |
| FR | 2164172 | A5 | 7/1973 |
| GB | 2057781 | A | 4/1981 |
| GB | 2335804 | A | 9/1999 |
| JP | H11329658 | A | 11/1999 |
| JP | 2000084680 | A | 3/2000 |
| JP | 2002310117 | A | 10/2002 |
| JP | 2008155238 | A | 7/2008 |
| WO | 9320382 | A1 | 10/1993 |
| WO | 9413040 | A1 | 6/1994 |
| WO | 2005104301 | A1 | 11/2005 |
| WO | 2009052691 | A1 | 4/2009 |

OTHER PUBLICATIONS

"European Examination Report Corresponding to European Patent Application No. 11 843 870.4; Dated: Aug. 18, 2016; 5 Pages".

"European Examination Report corresponding to Patent Application No. 11 843 870.4; Dated: Mar. 10, 2017".

"European Examination Report Corresponding to Patent Application No. 11 843 870.4; Dated: Mar. 10, 2017; 5 Pages".

"Examination Report corresponding to European Application No. 11843870.4 dated Nov. 14, 2017".

"Examination Report corresponding to European Application No. 13853093.6 dated Oct. 18, 2017".

"Examination Report Corresponding to European Patent Application No. 11843118.8 dated Nov. 28, 2018".

"Examination Report Corresponding to European Patent Application No. 11843870.4 dated Nov. 28, 2018".

"Examination Report corresponding to Indian Application No. 2354/DELNP/2014 dated Sep. 7, 2018".

"Examination Report corresponding to Indian Application No. 3912/CHEN/2013 dated Aug. 27, 2018".

"Examination Report corresponding to Indian Patent Application No. 4591/DELNP/2013, dated Aug. 7, 2018".

"Examination Report corresponding to Indian Patent Application No. 4592/DELNP/2013, dated Jul. 23, 2018".

"Examination report under sections 12 & 13 of the Patents Act, 1970 and the Patent Rules, 2003, IN Patent Application No. 4592/DELNP/2013, Jul. 23, 2018, 6 pp."

"International Search Report and Written Opinion Corresponding to International Application No. PCT/US2011/046054; Feb. 29, 2012".

"International Search Report and Written Opinion Corresponding to International Application No. PCT/US2011/052907; Date of Mailing: Mar. 23, 2012".

"International Search Report and Written Opinion for related PCT Application No. PCT/US2011/046048, date of mailing Feb. 9, 2012".

"International Search Report and Written Opinion for related PCT Application No. PCT/US2011/046048, date of mailing Feb. 9, 2012, 6 pages."

"International Search Report from related PCT filing PCT/US2011/046051, Feb. 9, 2012".

"International Search Report from related PCT filing PCT/US2011/046052, Apr. 6, 2012".

"Office Action corresponding to Chinese Application No. 201380057933.8 issued Jun. 30, 2016."

"Office Action corresponding to Indian Application No. 2277/DELNP/2015 dated Jan. 24, 2019".

"Office Action corresponding to Indian Application No. 2354/DELNP/2014 dated Sep. 7, 2018".

"Office Action corresponding to Indian Application No. 2355/DELNP/2014 dated Jan. 23, 2019".

"Office Action corresponding to Indian Application No. 3490/DELNP/2015 dated May 27, 2019".

"Office Action corresponding to Indian Application No. 3530/DELNP/2015 dated Jan. 22, 2019".

"Office Action corresponding to Indian Application No. 3861/DELNP/2015 dated Jan. 31, 2019".

"Office Action corresponding to Indian Application No. 3912/CHENP/2013 dated Aug. 27, 2018".

"Office Action corresponding to Indian Application No. 3975/CHENP/2013 dated Nov. 13, 2018".

"Office Action corresponding to Indian Application No. 4590/DELNP/2013 dated Dec. 1, 2018".

"Office Action corresponding to Indian Application No. 4591/DELNP/2013 dated Aug. 7, 2018".

"Office Action corresponding to Indian Application No. 4592/DELNP/2013 dated Jul. 23, 2018".

"Office Action corresponding to Indian Application No. 4594/DELNP/2013 dated Sep. 27, 2018".

Dupont, "General Design Principles for DuPont Engineering Polymers (Design guide—Module I)", Internet Citation, 2000, page complete, XP007904729, Retrieved from the Internet: http://plastics.dupont.com/plastics/pdflit/americas/general/H76838.pdf [retrieved on May 16, 2008], Chapter 111; pp. 77-90.

* cited by examiner

CONNECTOR AND COAXIAL CABLE WITH MOLECULAR BOND INTERCONNECTION

CROSS REFERENCE TO RELATED APPLICATIONS

This application is a continuation of commonly owned U.S. Utility patent application Ser. No. 17/823,202 titled "Coaxial Connector and Coaxial Cable with Welded Interconnection" filed Aug. 30, 2022, now U.S. Pat. No. 11,735, 874, which is a continuation of commonly owned U.S. Utility patent application Ser. No. 17/158,352 titled "Coaxial Connector and Coaxial Cable with Welded Interconnection" filed Jan. 26, 2021, now U.S. Pat. No. 11,437, 767, which is a continuation of commonly owned co-pending U.S. Utility patent application Ser. No. 15/443,690; titled "Coaxial Connector and Coaxial Cable with Welded Interconnection" filed Feb. 27, 2017, which is a continuation of commonly owned co-pending U.S. Utility patent application Ser. No. 14/520,749; titled "Connector and Coaxial Cable with Molecular Bond Interconnection" filed Oct. 22, 2014, which is a division of commonly owned co-pending U.S. Utility patent application Ser. No. 13/240,344, titled Connector and Coaxial Cable with Molecular Bond Interconnection" filed 22 Sep. 2011 by Kendrick Van Swearingen and James P. Fleming, hereby incorporated by reference in its entirety, which is a continuation-in-part of commonly owned co-pending U.S. Utility patent application Ser. No. 13/170,958, titled "Method and Apparatus For Radial Ultrasonic Welding Interconnected Coaxial Connector" filed Jun. 28, 2011 by Kendrick Van Swearingen, hereby incorporated by reference in its entirety. This application is also continuation-in-part of commonly owned U.S. Utility patent application Ser. No. 13/161,326, titled "Method and Apparatus for Coaxial Ultrasonic Welding Interconnection of Coaxial Connector and Coaxial Cable" filed Jun. 15, 2011 by Kendrick Van Swearingen, now issued as U.S. Pat. No. 8,365, 404, hereby incorporated by reference in its entirety. This application is also continuation-in-part of commonly owned co-pending U.S. Utility patent application Ser. No. 13/070, 934, titled "Cylindrical Surface Spin Weld Apparatus and Method of Use" filed Mar. 24, 2011 by Kendrick Van Swearingen, hereby incorporated by reference in its entirety. This application is also a continuation-in-part of commonly owned U.S. Utility patent application Ser. No. 12/980,013, titled "Ultrasonic Weld Coaxial Connector and Interconnection Method" filed Dec. 28, 2010 by Kendrick Van Swearingen and Nahid Islam, now issued as U.S. Pat. No. 8,453, 320, hereby incorporated by reference in its entirety. This application is also a continuation-in-part of commonly owned U.S. Utility patent application Ser. No. 12/974,765, titled "Friction Weld Inner Conductor Cap and Interconnection Method" filed Dec. 21, 2010 by Kendrick Van Swearingen and Ronald A. Vaccaro, now issued as U.S. Pat. No. 8,563,861, hereby incorporated by reference in its entirety. This application is also a continuation-in-part of commonly owned U.S. Utility patent application Ser. No. 12/962,943, titled "Friction Weld Coaxial Connector and Interconnection Method" filed Dec. 8, 2010 by Kendrick Van Swearingen, now issued as U.S. Pat. No. 8,302,296, hereby incorporated by reference in its entirety. This application is also a continuation-in-part of commonly owned U.S. Utility patent application Ser. No. 12/951,558, titled "Laser Weld Coaxial Connector and Interconnection Method", filed Nov. 22, 2010 by Ronald A. Vaccaro, Kendrick Van Swearingen, James P. Fleming, James J. Wlos and Nahid Islam, now issued as U.S. Pat. No. 8,826,525, hereby incorporated by reference in its entirety.

BACKGROUND

1. Field of the Invention

This invention relates to electrical cable connectors. More particularly, the invention relates to a coaxial connector interconnected with a coaxial cable via molecular bonding.

2. Description of Related Art

Coaxial cable connectors are used to terminate coaxial cables, for example, in communication systems requiring a high level of precision and reliability.

To create a secure mechanical and optimized electrical interconnection between a coaxial cable and connector, it is desirable to have generally uniform, circumferential contact between a leading edge of the coaxial cable outer conductor and the connector body. A flared end of the outer conductor may be clamped against an annular wedge surface of the connector body via a coupling body. Further, a conventional coaxial connector typically includes one or more separate environmental seals between the outer diameter of the outer conductor and the connector body and/or between the connector body and the jacket of the coaxial cable. Representative of this technology is commonly owned U.S. Pat. No. 6,793,529 issued Sep. 21, 2004 to Buenz. Although this type of connector is typically removable/re-useable, manufacturing and installation is complicated by the multiple separate internal elements required, interconnecting threads and related environmental seals.

Connectors configured for permanent interconnection with coaxial cables via solder and/or adhesive interconnection are also well known in the art. Representative of this technology is commonly owned U.S. Pat. No. 5,802,710 issued Sep. 8, 1998 to Bufanda et al. However, solder and/or adhesive interconnections may be difficult to apply with high levels of quality control, resulting in interconnections that may be less than satisfactory, for example when exposed to vibration and/or corrosion over time.

Passive Intermodulation Distortion, also referred to as PIM, is a form of electrical interference/signal transmission degradation that may occur with less than symmetrical interconnections and/or as electro-mechanical interconnections shift or degrade over time, for example due to mechanical stress, vibration, thermal cycling, oxidation formation and/or material degradation. PIM is an important interconnection quality characteristic, as PIM from a single low quality interconnection may degrade the electrical performance of an entire RF system.

Coaxial cables may be provided with connectors pre-attached. Such coaxial cables may be provided in custom or standardized lengths, for example for interconnections between equipment in close proximity to each other where the short cable portions are referred to as jumpers. To provide a coaxial cable with a high quality cable to connector interconnection may require either on-demand fabrication of the specified length of cable with the desired connection interface or stockpiling of an inventory of cables/jumpers in each length and interface that the consumer might be expected to request. On-demand fabrication and/or maintaining a large inventory of pre-assembled cable lengths, each with one of many possible connection interfaces, may increase delivery times and/or manufacturing/inventory costs.

Competition in the coaxial cable connector market has focused attention on improving electrical performance, interconnection quality consistency and long term reliability of the cable to connector interconnection. Further, reduction of overall costs, including materials, training and installation costs, is a significant factor for commercial success.

Therefore, it is an object of the invention to provide a coaxial connector and method of interconnection that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Figure 1:
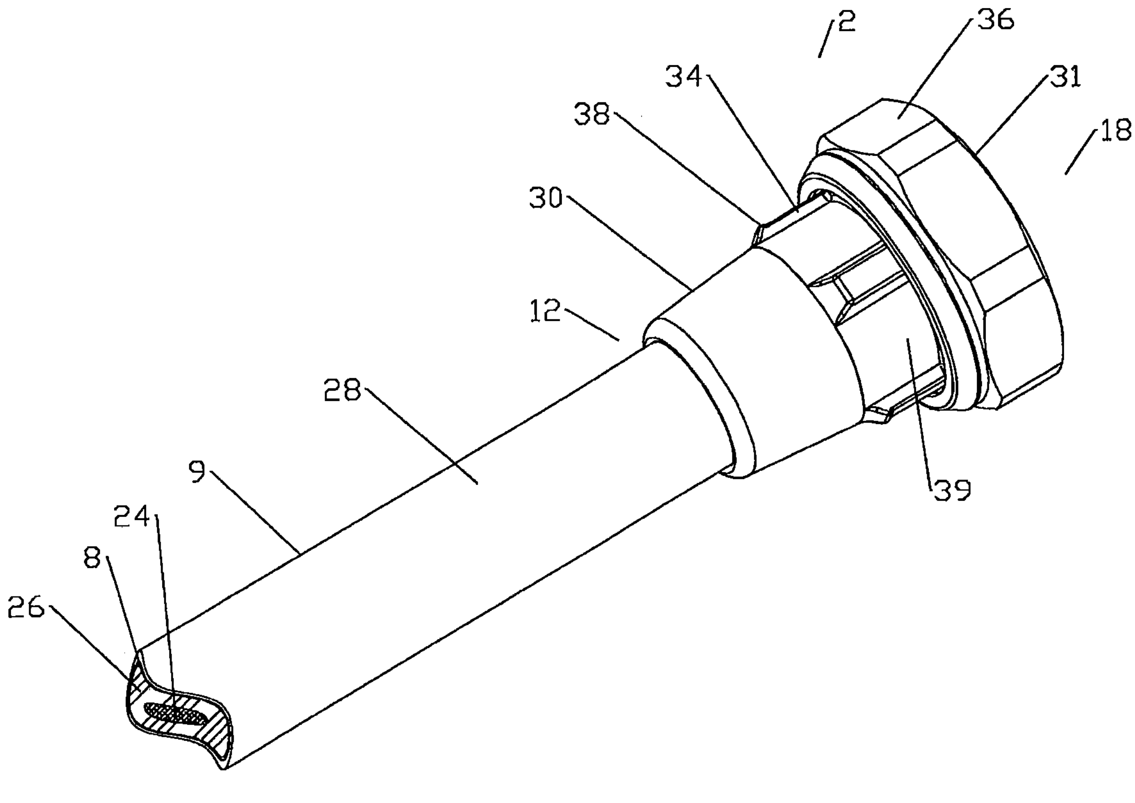
FIG. 1 is a schematic angled isometric view of an exemplary embodiment of a coaxial cable interconnected with a coaxial connector.

Aluminum has been applied as a cost-effective alternative to copper for the conductors in coaxial cables. However, aluminum oxide surface coatings quickly form upon air-exposed aluminum surfaces. These aluminum oxide surface coatings may degrade traditional mechanical, solder and/or conductive adhesive interconnections.

The inventor has recognized that, in contrast to traditional mechanical, solder and/or conductive adhesive interconnections, a molecular bond type interconnection reduces aluminum oxide surface coating issues, PIM generation and improves long term interconnection reliability.

A "molecular bond" as utilized herein is defined as an interconnection in which the bonding interface between two elements utilizes exchange, intermingling, fusion or the like of material from each of two elements bonded together. The exchange, intermingling, fusion or the like of material from each of two elements generates an interface layer where the comingled materials combine into a composite material comprising material from each of the two elements being bonded together.

One skilled in the art will recognize that a molecular bond may be generated by application of heat sufficient to melt the bonding surfaces of each of two elements to be bonded together, such that the interface layer becomes molten and the two melted surfaces exchange material with one another. Then, the two elements are retained stationary with respect to one another, until the molten interface layer cools enough to solidify.

The resulting interconnection is contiguous across the interface layer, eliminating interconnection quality and/or degradation issues such as material creep, oxidation, galvanic corrosion, moisture infiltration and/or interconnection surface shift.

A molecular bond between the outer conductor 8 of a coaxial cable 9 and a connector body 4 of a coaxial connector 2 may be generated via application of heat to the desired interconnection surfaces between the outer conductor 8 and the connector body 4, for example via laser or friction welding. Friction welding may be applied, for example, as spin and/or ultrasonic type welding.

Even if the outer conductor 8 is molecular bonded to the connector body 4, it may be desirable to prevent moisture or the like from reaching and/or pooling against the outer diameter of the outer conductor 8, between the connector body 4 and the coaxial cable 9. Ingress paths between the connector body 4 and coaxial cable 9 at the cable end may be permanently sealed by applying a molecular bond between a polymer material overbody 30 of the coaxial connector 2 and a jacket 28 of the coaxial cable 9. The overbody 30, as shown for example in FIGS. 1 and 2, may be applied to the connector body 4 as an overmolding of polymeric material.

Depending upon the applied connection interface 31, demonstrated in several of the exemplary embodiments herein as a standard 7/16 DIN male interface, the overbody 30 may also provide connection interface structure, such as an alignment cylinder 38. The overbody 30 may also be provided dimensioned with an outer diameter cylindrical support surface 34 at the connector end 18 and further reinforcing support at the cable end 12, enabling reductions in the size of the connector body 4, thereby potentially reducing overall material costs. Tool flats 39 for retaining the coaxial connector 2 during interconnection with other cables and/or devices may be formed in the cylindrical support surface 34 by removing surface sections of the cylindrical support surface 34.

One skilled in the art will appreciate that connector end 18 and cable end 12 are applied herein as identifiers for respective ends of both the coaxial connector 2 and also of discrete elements of the coaxial connector 2 and apparatus, to identify same and their respective interconnecting surfaces according to their alignment along a longitudinal axis of the connector between a connector end 18 and a cable end 12.

The coupling nut 36 may be retained upon the support surface 34 and/or support ridges at the connector end 18 by an overbody flange 32. At the cable end 12, the coupling nut 36 may be retained upon the cylindrical support surface 34 and/or support ridges of the overbody 30 by applying one or more retention spurs 41 proximate the cable end of the cylindrical support surface 34. The retention spurs 41 may be angled with increasing diameter from the cable end 12 to the connector end 18, allowing the coupling nut 36 to be passed over them from the cable end 12 to the connector end 18, but then retained upon the cylindrical support surface 34 by a stop face provided at the connector end 18 of the retention spurs 41.

The overbody flange 32 may be securely keyed to a connector body flange 40 of the connector body 4 and thereby with the connector body 4 via one or more interlock apertures 42 such as holes, longitudinal knurls, grooves, notches or the like provided in the connector body flange 40 and/or outer diameter of the connector body 4, as shown for example in FIG. 1. Thereby, as the polymeric material of the overbody 30 flows into the one or more interlock apertures 42 during overmolding, upon curing the overbody 30 is permanently coupled to and rotationally interlocked with the connector body 4.

The cable end of the overbody 30 may be dimensioned with an inner diameter friction surface 44 proximate that of the coaxial cable jacket 28, that creates an interference fit with respect to an outer diameter of the jacket 28, enabling a molecular bond between the overbody 30 and the jacket 28, by friction welding rotation of the connector body 4 with respect to the outer conductor 8, thereby eliminating the need for environmental seals at the cable end 12 of the connector/cable interconnection.

Figure 3:
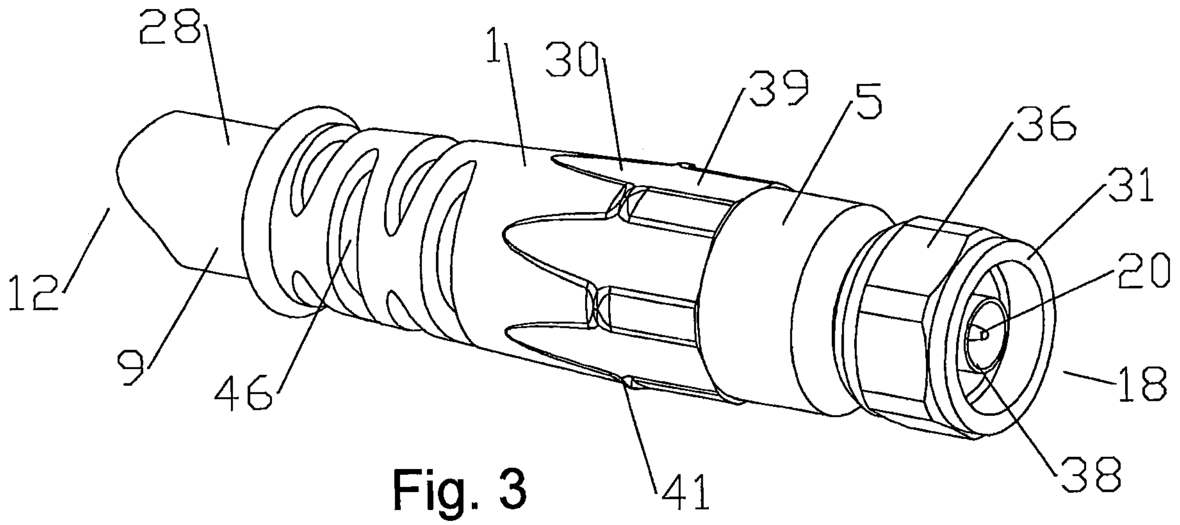
FIG. 3 is a schematic angled isometric view of another exemplary embodiment of a coaxial cable interconnected with a coaxial connector.

The overbody 30 may provide a significant strength and protection characteristic to the mechanical interconnection. The overbody 30 may also have an extended cable portion proximate the cable end provided with a plurality of stress relief control apertures 46, for example as shown in FIG. 3. The stress relief control apertures 46 may be formed in a generally elliptical configuration with a major axis of the stress relief control apertures 46 arranged normal to the longitudinal axis of the coaxial connector 2. The stress relief control apertures 46 enable a flexible characteristic of the cable end of the overbody 30 that increases towards the cable end of the overbody 30. Thereby, the overbody 30 supports the interconnection between the coaxial cable 9 and the coaxial connector 2 without introducing a rigid end edge along which the connected coaxial cable 2 subjected to bending forces may otherwise buckle, which may increase both the overall strength and the flexibility characteristics of the interconnection.

The jacket 28 and and/or the inner diameter of the overbody 30 proximate the friction area 44 may be provided as a series of spaced apart annular peaks of a contour pattern such as a corrugation, or a stepped surface, to provide enhanced friction, allow voids for excess friction weld material flow and/or add key locking for additional strength. In one alternative, the overbody 30 may be overmolded upon the connector body 4 after interconnection with the outer conductor 8, the heat of the injected polymeric material bonding the overbody 30 with and/or sealing against the jacket 28 in a molecular bond if the heat of the injection molding is sufficient to melt at least the outer diameter surface of the jacket 28. In another alternative, the overbody may be molecular bonded to the jacket 28 via laser welding applied to the edge between the jacket 28 and the cable end of the overbody.

Where a molecular bond at this area is not critical, the overbody 30 may be sealed against the outer jacket 28 via interference fit and/or application of an adhesive/sealant.

Figure 4:
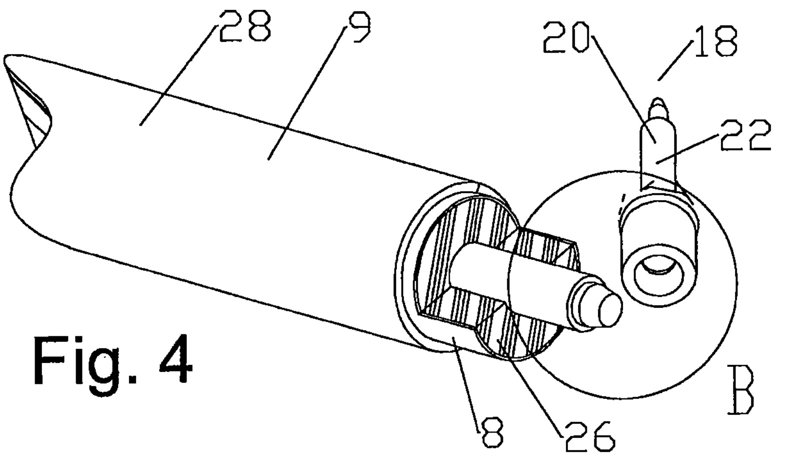
FIG. 4 is a schematic partial cut-away view of a prepared coaxial cable end and inner conductor cap.
Figure 5:
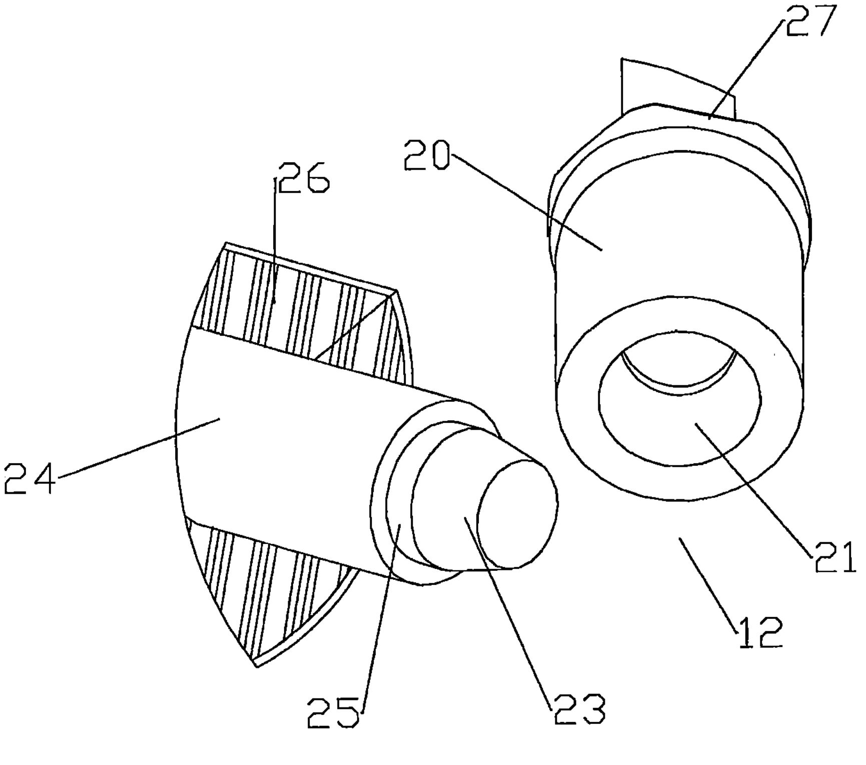
FIG. 5 is a close-up view of area B of FIG. 4.

Prior to interconnection, the leading end of the coaxial cable 9 may be prepared by cutting the coaxial cable 9 so that the inner conductor 24 extends from the outer conductor 8, for example as shown in FIGS. 4 and 5. Also, dielectric material 26 between the inner conductor 24 and outer conductor 8 may be stripped back and a length of the outer jacket 28 removed to expose desired lengths of each. The inner conductor 24 may be dimensioned to extend through the attached coaxial connector 2 for direct interconnection with a further coaxial connector 2 as a part of the connection interface 31. Alternatively, for example where the connection interface 31 selected requires an inner conductor profile that is not compatible with the inner conductor 24 of the selected coaxial cable 9 and/or where the material of the inner conductor 24 is an undesired inner conductor connector interface material, such as aluminum, the inner conductor 24 may be terminated by applying an inner conductor cap 20.

An inner conductor cap 20, for example formed from a metal such as brass, bronze or other desired metal, may be applied with a molecular bond to the end of the inner conductor 24, also by friction welding such as spin or ultrasonic welding. The inner conductor cap 20 may be provided with an inner conductor socket 21 at the cable end 12 and a desired inner conductor interface 22 at the connector end 18. The inner conductor socket 21 may be dimensioned to mate with a prepared end 23 of an inner conductor 24 of the coaxial cable 9. To apply the inner conductor cap 20, the end of the inner conductor 24 may be prepared to provide a pin profile corresponding to the selected socket geometry of the inner conductor cap 20. To allow material inter-flow during welding attachment, the socket geometry of the inner conductor cap 20 and/or the end of the inner conductor 24 may be formed to provide a material gap 25 when the inner conductor cap 20 is seated upon the prepared end 23 of the inner conductor 24.

A rotation key 27 may be provided upon the inner conductor cap 20, the rotation key 27 dimensioned to mate with a spin tool or a sonotrode for rotating and/or torsionally reciprocating the inner conductor cap 20, for molecular bond interconnection via spin or ultrasonic friction welding.

Alternatively, the inner conductor cap 20 may be applied via laser welding applied to a seam between the outer diameter of the inner conductor 24 and an outer diameter of the cable end 12 of the inner conductor cap 20.

Figure 2:
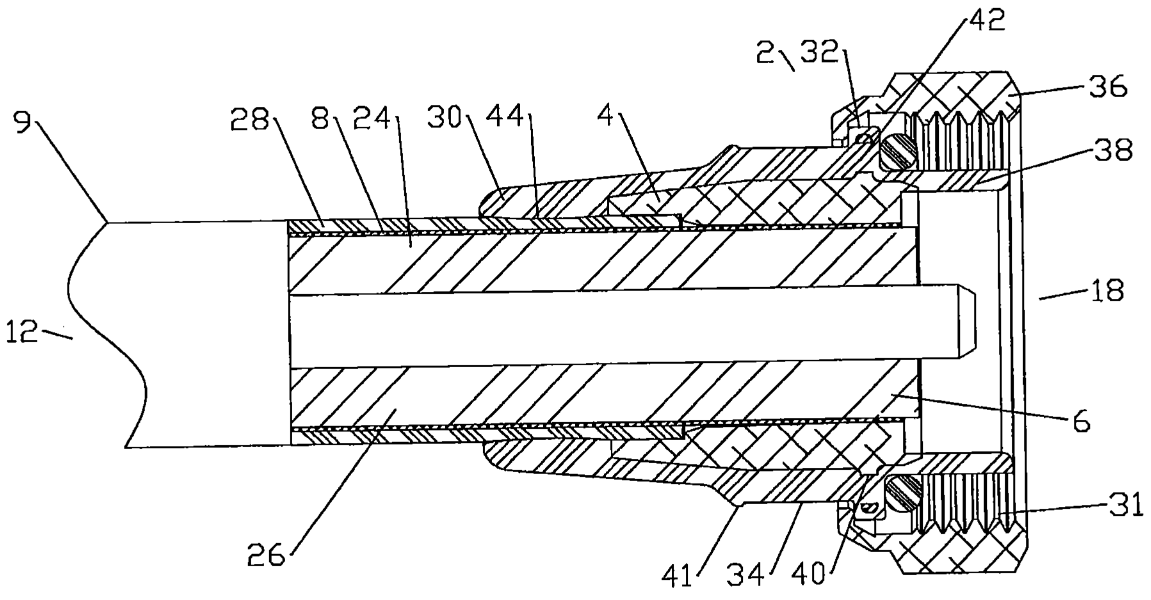
FIG. 2 is a schematic cut-away side view of FIG. 1, demonstrating the molecular bond of the outer conductor and connector body via laser weld.

A connector body 4 configured for a molecular bond between the outer conductor 8 and the connector body 4 via laser welding is demonstrated in FIGS. 1 and 2. The connector body 4 is slid over the prepared end of the coaxial cable 9 so that the outer conductor 8 is flush with the connector end 18 of the connector body bore 6, enabling application of a laser to the circumferential joint between the outer diameter of the outer conductor 8 and the inner diameter of the connector body bore 6 at the connector end 18.

Prior to applying the laser to the outer conductor 8 and connector body 4 joint, a molecular bond between the overbody 30 and the jacket 28 may be applied by spinning the connector body 4 and thereby a polymer overbody 30 applied to the outer diameter of the connector body 4 with respect to the coaxial cable 9. As the overbody 30 is rotated with respect to the jacket 28, the friction surface 44 is heated sufficient to generate a molten interface layer which fuses the overbody 30 and jacket 28 to one another in a circumferential molecular bond when the rotation is stopped and the molten interface layer allowed to cool.

With the overbody 30 and jacket 28 molecular bonded together, the laser may then be applied to the circumference of the outer conductor 8 and connector body 4 joint, either as a continuous laser weld or as a series of overlapping point welds until a circumferential molecular bond has been has been obtained between the connector body 4 and the outer conductor 8. Alternatively, the connector body bore 6 may be provided with an inward projecting shoulder proximate the connector end 18 of the connector body bore 6, that the outer conductor 8 is inserted into the connector body bore 6 to abut against and the laser applied at an angle upon the seam between the inner diameter of the outer conductor end and the inward projecting shoulder, from the connector end 18.

Figure 6:
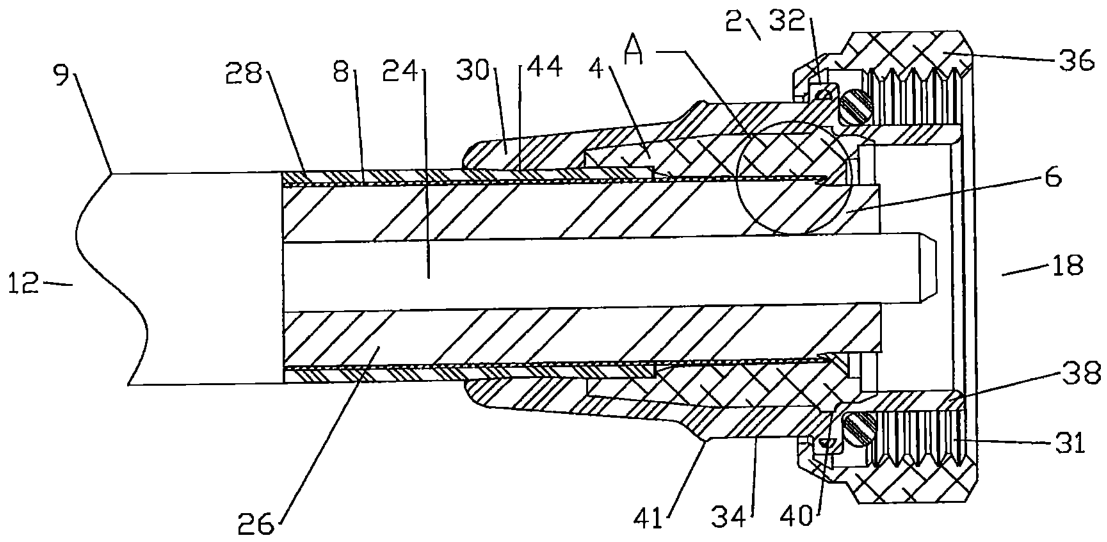
FIG. 6 is a schematic cut-away side view of a coaxial connector interconnected with a coaxial connector, demonstrating the molecular bond of the outer conductor and connector body via spin weld.
Figure 7:
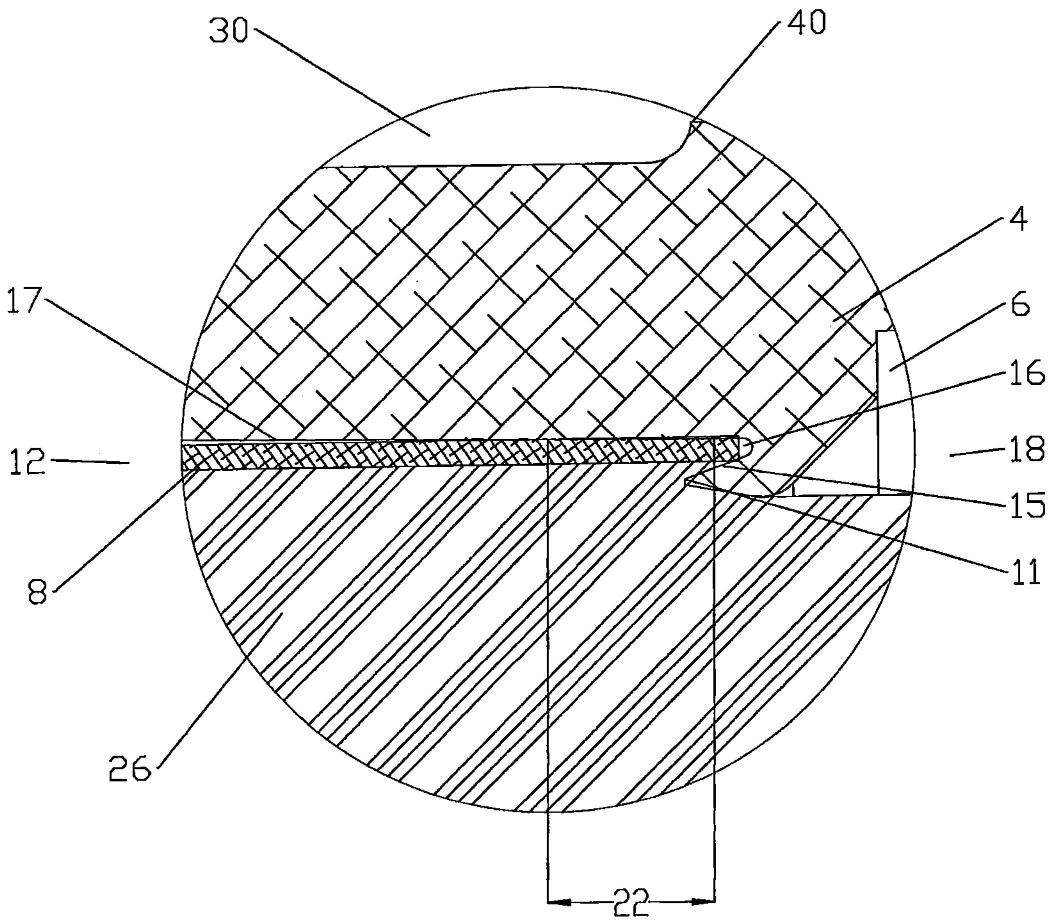
FIG. 7 is a close-up view of area A of FIG. 6.

A molecular bond obtained between the outer conductor and the connector body via spin type friction welding is demonstrated in FIGS. 6 and 7. The bore of the connector body is provided with an inward projecting shoulder 11 angled toward a cable end 12 of the connector body 4 that forms an annular friction groove 15 open to the cable end 12. As best shown in FIG. 7, the friction groove 15 is dimensioned to receive a leading edge of the outer conductor 8 therein, a thickness of the outer conductor 8 preventing the outer conductor 8 from initially bottoming in the friction groove 15, forming an annular material chamber 16 between the leading edge of the outer conductor 8 and the bottom of the friction groove 15, when the outer conductor 8 is initially seated within the friction groove 15. Further, the bore sidewall 17 may be diametrically dimensioned to create a friction portion 22 proximate the friction groove 15. The friction portion 22 creates additional interference between the bore sidewall 20 and the outer diameter of the outer conductor 8, to increase friction during friction welding.

To initiate friction welding, the connector body 4 is rotated with respect to the outer conductor 8 during seating of the leading edge of the outer conductor 8 within the friction portion 22 and into the friction groove 15, under longitudinal pressure. During rotation, for example at a speed of 250 to 500 revolutions per minute, the friction between the leading edge and/or outer diameter of the outer conductor 8 and the friction portion 22 and/or friction groove 15 of the bore 6 generate sufficient heat to soften the leading edge and/or localized adjacent portions of the outer conductor 8 and connector body 4, forging them together as the sacrificial portion of the outer conductor 8 forms a plastic weld bead that flows into the material chamber 16 to fuse the outer conductor 8 and connector body 4 together in a molecular bond.

As described herein above, the overbody 30 may be similarly dimensioned with a friction surface 44 with respect to the jacket 28, to permit spin welding to simultaneously form a molecular bond there between, as the rotation is applied to perform the spin welding to achieve the molecular bond between the outer conductor 8 and the connector body 4.

When spin welding is applied to simultaneously form a molecular bond between both the polymer overbody 30 and jacket 28 and the metallic outer conductor 8 and connector body 4, a connector outer circumference encapsulating and/or radial inward compressing spin welding apparatus may be applied, so that the polymer portions do not heat to a level where they soften/melt to the point where the centrifugal force generated by the rotation will separate them radially outward, before the metal portions also reach the desired welding temperature.

Alternatively, a molecular bond may be formed via ultrasonic welding by applying ultrasonic vibrations under pressure in a join zone between two parts desired to be welded together, resulting in local heat sufficient to plasticize adjacent surfaces that are then held in contact with one another until the interflowed surfaces cool, completing the molecular bond. An ultrasonic weld may be applied with high precision via a sonotrode and/or simultaneous sonotrode ends to a point and/or extended surface. Where a point ultrasonic weld is applied, successive overlapping point welds may be applied to generate a continuous ultrasonic weld. Ultrasonic vibrations may be applied, for example, in a linear direction and/or reciprocating along an arc segment, known as torsional vibration.

Figure 8:
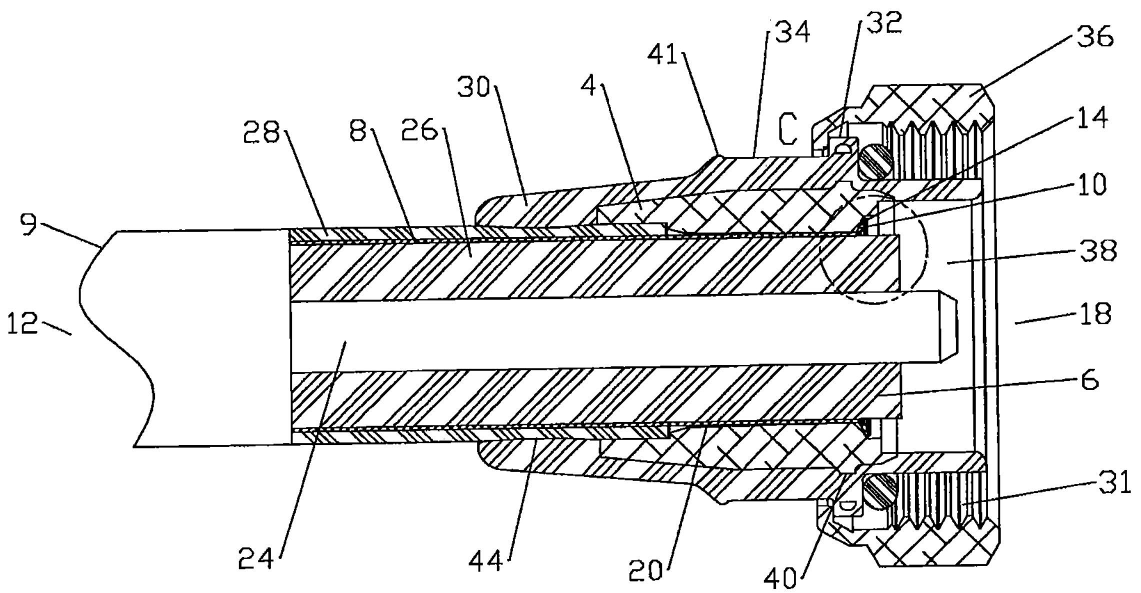
FIG. 8 is a schematic cut-away side view of a coaxial connector interconnected with a coaxial connector, demonstrating the molecular bond of the outer conductor and connector body via ultrasonic weld.
Figure 9:
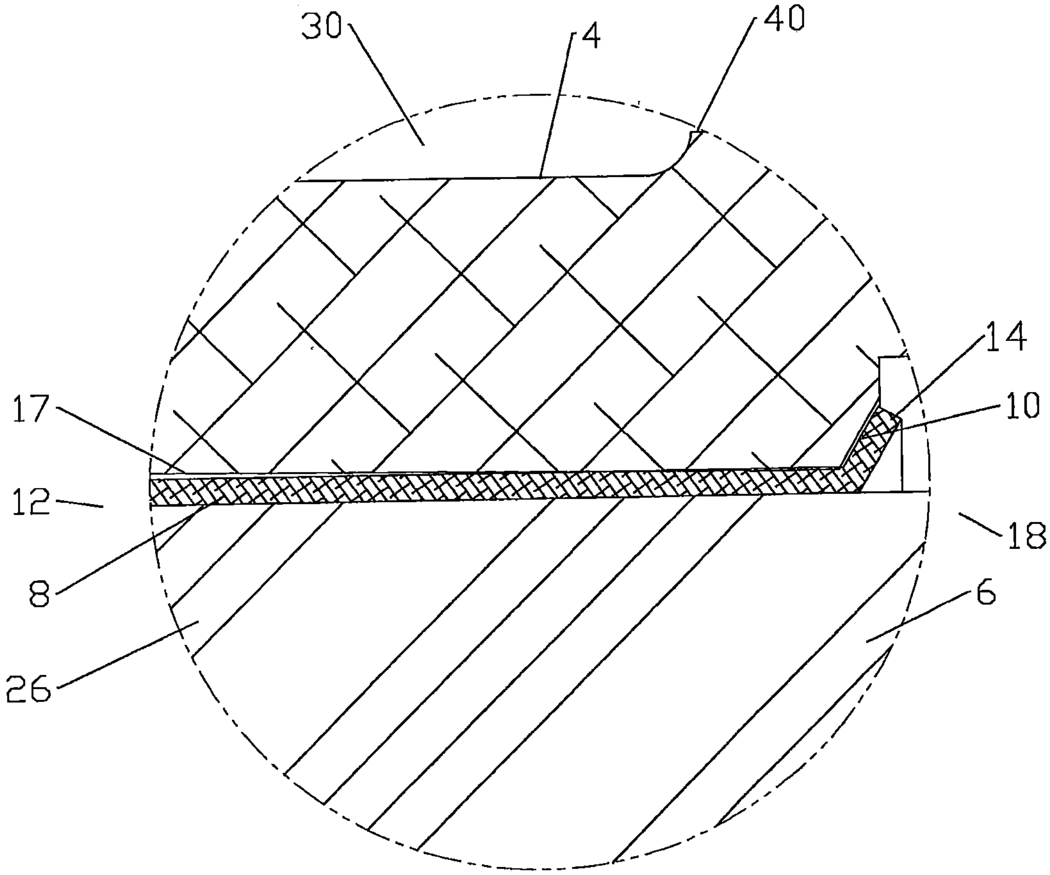
FIG. 9 is a close-up view of area C of FIG. 8.
Figure 10:
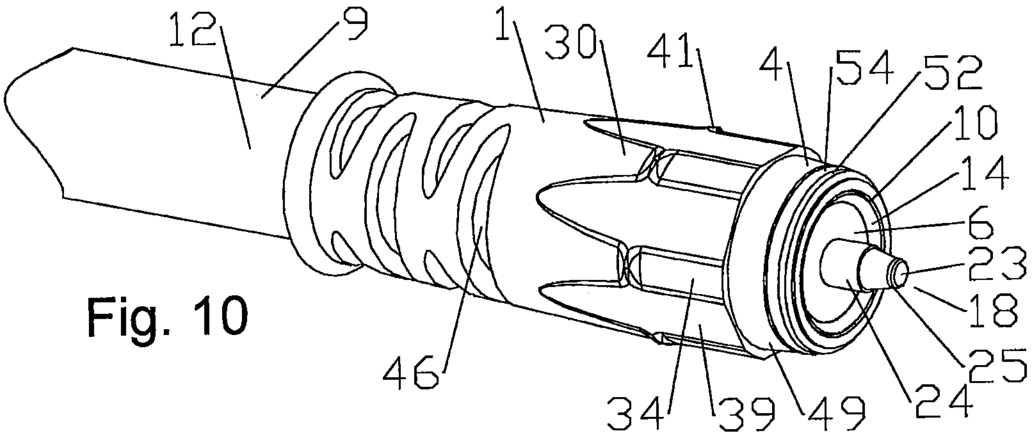
FIG. 10 is a schematic isometric view of an exemplary embodiment of a connector adapter interconnected with a coaxial cable.
Figure 11:
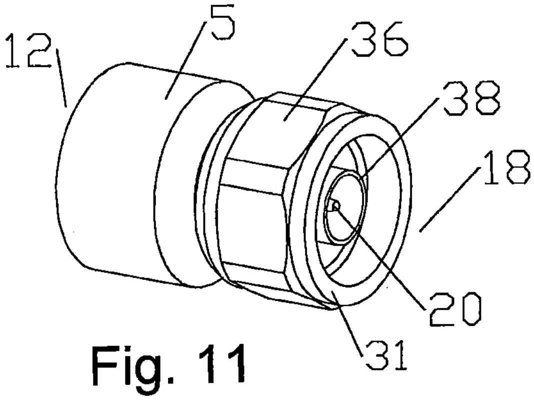
FIG. 11 is a schematic isometric view of an interface end, with a Type-N Male connector interface.
Figure 12:
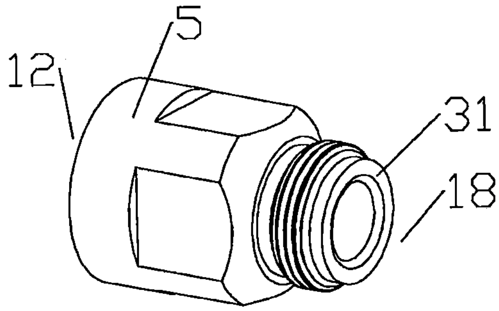
FIG. 12 is a schematic isometric view of an interface end, with a Type-N Female connector interface.
Figure 13:
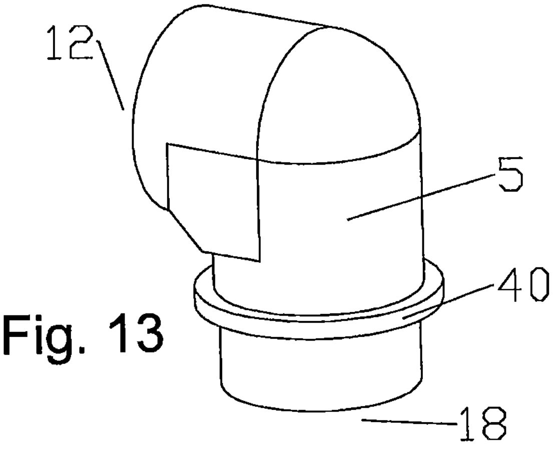
FIG. 13 is a schematic isometric view of an interface end with an angled 7/16 DIN-Male connector interface.

Exemplary embodiments of an inner and outer conductor molecular bond coaxial connector 2 and coaxial cable interconnection via ultrasonic welding are demonstrated in FIGS. 8 and 9. As best shown in FIG. 8, a unitary connector body 4 is provided with a bore 6 dimensioned to receive the outer conductor 8 of the coaxial cable 9 therein. As best shown in FIG. 9, a flare seat 10 angled radially outward from the bore 6 toward a connector end 18 of the connector body 4 is open to the connector end of the coaxial connector 2 providing a mating surface to which a leading end flare 14 of the outer conductor 8 may be ultrasonically welded by an outer conductor sonotrode of an ultrasonic welder inserted to contact the leading end flare 14 from the connector end 18.

The cable end 12 of the coaxial cable 9 is inserted through the bore 6 and an annular flare operation is performed on a leading edge of the outer conductor 8. The resulting leading end flare 14 may be angled to correspond to the angle of the flare seat 10 with respect to a longitudinal axis of the coaxial connector 2. By performing the flare operation against the flare seat 10, the resulting leading end flare 14 can be formed with a direct correspondence to the flare seat angle. The flare operation may be performed utilizing the leading edge of an outer conductor sonotrode, provided with a conical cylindrical inner lip with a connector end diameter less than an inner diameter of the outer conductor 8, for initially engaging and flaring the leading edge of the outer conductor 8 against the flare seat 10.

The flaring operation may be performed with a separate flare tool or via advancing the outer conductor sonotrode to contact the leading edge of the head of the outer conductor 8, resulting in flaring the leading edge of the outer conductor 8 against the flare seat 10. Once flared, the outer conductor sonotrode is advanced (if not already so seated after flaring is completed) upon the leading end flare 14 and ultrasonic welding may be initiated.

Ultrasonic welding may be performed, for example, utilizing linear and/or torsional vibration. In linear vibration ultrasonic-type friction welding of the leading end flare 14 to the flare seat 10, a linear vibration is applied to a cable end side of the leading end flare 14, while the coaxial connector 2 and flare seat 10 there within are held static within the fixture. The linear vibration generates a friction heat which plasticizes the contact surfaces between the leading end flare 14 and the flare seat 10, forming a molecular bond upon cooling. Where linear vibration ultrasonic-type friction welding is utilized, a suitable frequency and linear displacement, such as between 20 and 40 KHz and 20-35 microns, selected for example with respect to a material characteristic, diameter and/or sidewall thickness of the outer conductor 8, may be applied.

In a further embodiment, as demonstrated in FIGS. 3 and 10-14, the connector body 4 and overbody 30 molecular bonds may be pre-applied upon the end of the coaxial cable 9 as a connector adapter 1 to provide a standard cable end termination upon which a desired interface end 5 may be applied to provide simplified batch manufacture and inventory that may be quickly finished with any of a variety of interface ends 5 with connection interfaces as required for each specific consumer demand. As demonstrated in the several embodiments herein above, the connector body 4 configured as a connector adapter 1 at the connector end 18 may be configured for molecular bonding with the outer conductor 8 via laser, spin or ultrasonic welding.

With the desired inner conductor cap 20 coupled to the inner conductor 24, preferably via a molecular bond as described herein above, the corresponding interface end 5 may be seated upon the mating surface 49 and ultrasonic welded. As shown for example in FIG. 10, the mating surface 49 may be provided with a diameter which decreases towards the connector end 18, such as a conical or a curved surface, enabling a self-aligning fit that may be progressively tightened by application of axial compression.

Figure 14:
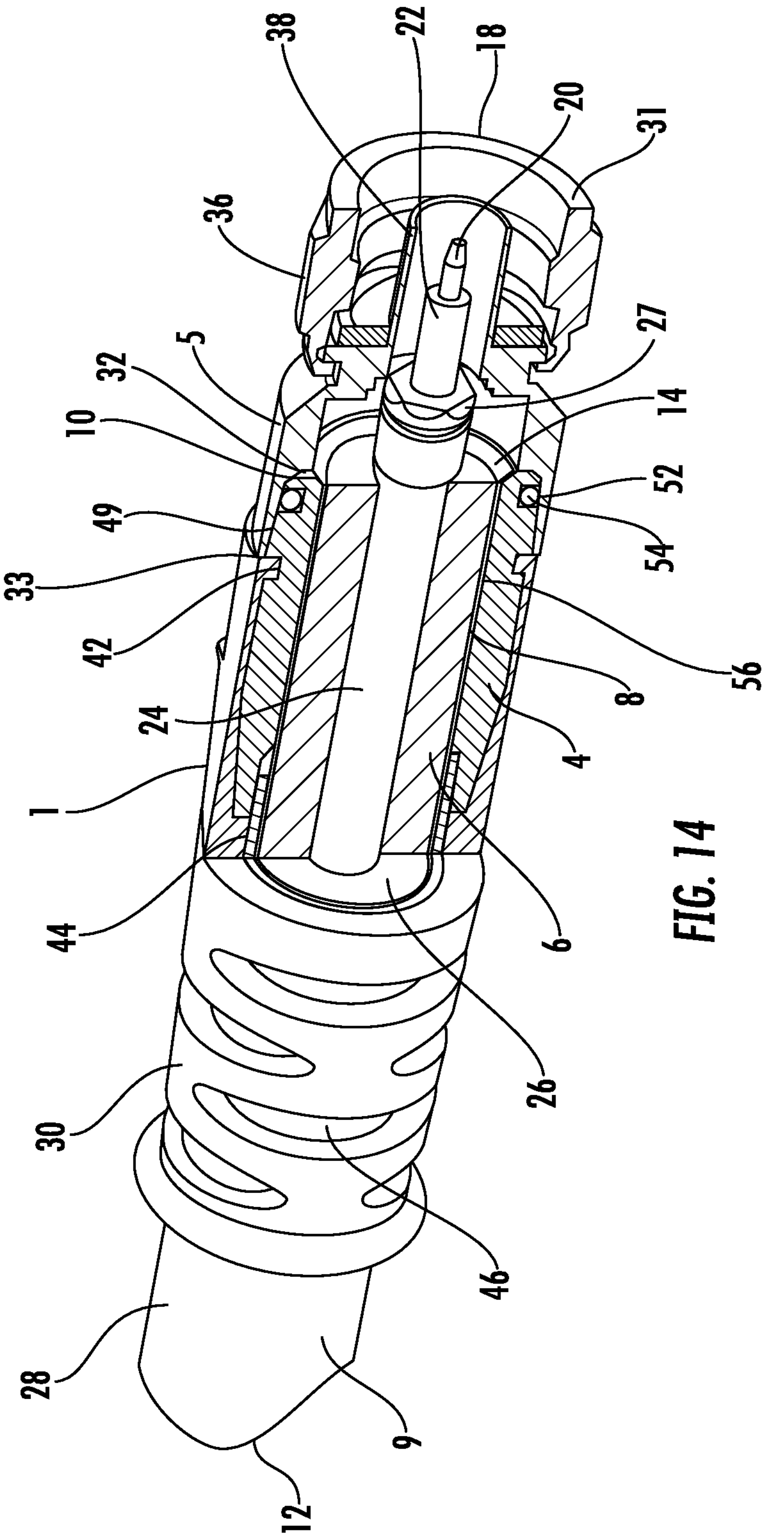
FIG. 14 is a schematic isometric partial cut-away view of FIG. 3.

As best shown in FIG. 14, the selected interface end 5 seats upon a mating surface 49 provided on the connector end 18 of the connector adapter 1. The interface end 5 may be seated upon the mating surface 49, for example in a self aligning interference fit, until the connector end of the connector adapter 1 abuts a shoulder within the interface end bore and/or cable end of the connector adapter 1 abuts a stop shoulder 33 of the connector end of the overbody 30.

An annular seal groove 52 may be provided in the mating surface for a gasket 54 such as a polymer o-ring for environmentally sealing the interconnection of the connector adapter 1 and the selected interface end 5.

As the mating surfaces between the connector adapter 1 and the connector end 2 are located spaced away from the connector end 18 of the resulting assembly, radial ultrasonic welding is applied. A plurality of sonotrodes may be extended radially inward toward the outer diameter of the cable end 12 of the interface end 5 to apply the selected ultrasonic vibration to the joint area. Alternatively, a single sonotrode may be applied moving to address each of several designated arc portions of the outer diameter of the joint area or upon overlapping arc portions of the outer diameter of the joint area in sequential welding steps or in a continuous circumferential path along the join zone. Where the seal groove 52 and gasket 54 are present, even if a contiguous circumferential weld is not achieved, the interconnection remains environmentally sealed.

One skilled in the art will appreciate that molecular bonds have been demonstrated between the overbody 30 and jacket 28, the outer conductor 8 and the connector body 4, the inner conductor 24 and inner conductor cap 20 and connector adapter 1 and interface end 5. Each of these interconnections may be applied either alone or in combination with the others to achieve the desired balance of cost, reliability, speed of installation and versatility.

One skilled in the art will appreciate that the molecular bonds eliminate the need for further environmental sealing, simplifying the coaxial connector 2 configuration and eliminating a requirement for multiple separate elements and/or discrete assembly. Because the localized melting of the laser, spin or ultrasonic welding processes utilized to form the molecular bond can break up any aluminum oxide surface coatings in the immediate weld area, no additional treatment may be required with respect to removing or otherwise managing the presence of aluminum oxide on the interconnection surfaces, enabling use of cost and weight efficient aluminum materials for the coaxial cable conductors and/or connector body. Finally, where a molecular bond is established at each electro-mechanical interconnection, PIM resulting from such interconnections may be significantly reduced and/or entirely eliminated.

TABLE OF PARTS

| | |
|---|---|
| 1 | connector adapter |
| 2 | coaxial connector |
| 4 | connector body |
| 5 | interface end |
| 6 | bore |
| 8 | outer conductor |
| 9 | coaxial cable |
| 10 | flare seat |
| 11 | inward projecting shoulder |
| 12 | cable end |
| 14 | leading end flare |
| 15 | friction groove |
| 16 | annular material chamber |
| 17 | bore sidewall |
| 18 | connector end |
| 20 | inner conductor cap |
| 21 | inner conductor socket |
| 22 | inner conductor interface |
| 23 | prepared end |
| 24 | inner conductor |
| 25 | material gap |
| 26 | dielectric material |
| 27 | rotation key |
| 28 | jacket |
| 30 | overbody |
| 31 | connection interface |
| 32 | overbody flange |
| 34 | support surface |
| 36 | coupling nut |
| 38 | alignment cylinder |
| 39 | tool flat |
| 40 | connector body flange |
| 41 | retention spur |
| 42 | interlock aperture |
| 44 | friction surface |
| 46 | stress relief control aperture |
| 49 | mating surface |
| 52 | seal groove |
| 54 | gasket |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A coaxial cable-connector assembly comprising:

a. a coaxial cable comprising an inner conductor, an outer conductor circumferentially surrounding the inner conductor, and a dielectric layer interposed between the inner conductor and the outer conductor, wherein the outer conductor has a leading end; and b. a coaxial connector comprising:

an inner contact having a first end electrically connected to the inner conductor of the coaxial cable, and a second opposed end;

a conductive member defining a circumferential bore; and;

an interface member that circumferentially overlies the conductive member, the interface member having a cylindrical distal end;

wherein a circumferential welded seam is located within the circumferential bore of the conductive member and along an electrical path formed between the leading end of the outer conductor of the coaxial cable and the cylindrical distal end of the interface member.

2. The assembly defined in claim 1, wherein the conductive member is a connector body.

3. The assembly defined in claim 1, wherein the interface member is an interface end.

4. The assembly defined in claim 1, further comprising an overbody that circumferentially overlies at least a portion of the conductive member.

5. The assembly defined in claim 1, wherein an axis defined by the cylindrical distal end is generally collinear with an axis defined by the inner contact between the first and second ends.

6. The assembly defined in claim 1, wherein the outer conductor of the coaxial cable has a smooth profile.

7. A coaxial cable-connector assembly comprising:

a. a coaxial cable comprising an inner conductor, an outer conductor circumferentially surrounding the inner conductor, and a dielectric layer interposed between the inner conductor and the outer conductor, wherein the outer conductor has a leading end; and b. a coaxial connector comprising:

an inner contact having a first end electrically connected to the inner conductor of the coaxial cable, and a second opposed end;

a connector body defining a circumferential bore; and;

an interface end that circumferentially overlies the connector body, the interface end having a cylindrical distal end;

wherein a circumferential welded seam is located within the circumferential bore of the connector body and along an electrical path formed between the leading end of the outer conductor of the coaxial cable and the cylindrical distal end of the interface end.

8. The assembly defined in claim 7, wherein the interface end is connected with the connector body via an interference fit.

9. The assembly defined in claim 7, further comprising an overbody that circumferentially overlies at least a portion of the connector body.

10. The assembly defined in claim 7, wherein an axis defined by the cylindrical distal end is generally collinear with an axis defined by the inner contact between the first and second ends.

11. The assembly defined in claim 7, wherein the outer conductor of the coaxial cable has a smooth profile.

12. A coaxial cable-connector assembly comprising:

a. a coaxial cable comprising an inner conductor, an outer conductor circumferentially surrounding the inner conductor, and a dielectric layer interposed between the inner conductor and the outer conductor, wherein the outer conductor has a leading end; and b. a coaxial connector comprising:

an inner contact having a first end electrically connected to the inner conductor of the coaxial cable, and a second opposed end;

a conductive member defining a circumferential bore; and;

an interface member that circumferentially overlies the conductive member;

wherein a circumferential welded seam is located within the circumferential bore of the conductive member and along an electrical path formed between the leading end of the outer conductor of the coaxial cable and the cylindrical distal end of the interface member; and wherein the interface member is connected with the conductive member via an interference fit.

13. The assembly defined in claim 12, further comprising an overbody that circumferentially overlies at least a portion of the conductive member.

14. The assembly defined in claim 12, wherein an axis defined by the cylindrical distal end is generally collinear with an axis defined by the inner contact between the first and second ends.

15. The assembly defined in claim 12, wherein the outer conductor of the coaxial cable has a smooth profile.

16. The assembly defined in claim 12, wherein the interface member is an interface end.

17. The assembly defined in claim 12, wherein the conductive sleeve member is a connector body.

* * * * *